(12) United States Patent
Cipolla

(10) Patent No.: US 8,118,277 B2
(45) Date of Patent: Feb. 21, 2012

(54) INTERCEPTING VALVE

(75) Inventor: Giovanni Cipolla, Cremona (IT)

(73) Assignee: Enolgas Bonomi S.p.A., Concesio, Brescia (IT)

( * ) Notice: Subject to any disclaimer, the term of this patent is extended or adjusted under 35 U.S.C. 154(b) by 418 days.

(21) Appl. No.: 12/519,943

(22) PCT Filed: Dec. 11, 2007

(86) PCT No.: PCT/IT2007/000862
§ 371 (c)(1),
(2), (4) Date: Jul. 22, 2009

(87) PCT Pub. No.: WO2008/075394
PCT Pub. Date: Jun. 26, 2008

(65) Prior Publication Data
US 2010/0090139 A1    Apr. 15, 2010

(30) Foreign Application Priority Data
Dec. 18, 2006 (EP) .............................. BS2006A0221

(51) Int. Cl.
*F16K 5/00* (2006.01)
(52) U.S. Cl. ........................................ 251/309; 251/304

(58) Field of Classification Search .................. 251/125, 251/126, 127, 304, 309
See application file for complete search history.

(56) References Cited

U.S. PATENT DOCUMENTS

| | | | | |
|---|---|---|---|---|
| 3,191,906 A | * | 6/1965 | Zeigler et al. | 251/208 |
| 3,504,887 A | * | 4/1970 | Okerblom | 251/208 |
| 4,037,818 A | * | 7/1977 | Soderberg et al. | 251/121 |
| 4,989,833 A | * | 2/1991 | Polon | 251/209 |
| 5,116,019 A | * | 5/1992 | Rohweder et al. | 251/127 |
| 5,476,246 A | * | 12/1995 | Wendel et al. | 251/129.11 |
| 6,981,691 B2 | * | 1/2006 | Caprera | 251/298 |
| 2005/0258388 A1 | | 11/2005 | Loga | |

FOREIGN PATENT DOCUMENTS
EP     0376502      7/1990
FR     1047150      12/1953
JP     2000 266195  9/2000

* cited by examiner

*Primary Examiner* — John Fristoe, Jr.
(74) *Attorney, Agent, or Firm* — Shoemaker and Mattare

(57) ABSTRACT

The present invention has as its object an intercepting valve of a fluid comprising an obturator which can be turned clockwise or anti-clockwise. By turning clockwise, the fluid in transit is given a first characterization, while by turning anti-clockwise it is given a second characterization. In addition, the present invention has as its object, a method of fabrication of a valve fitted with obturator as described above.

8 Claims, 5 Drawing Sheets

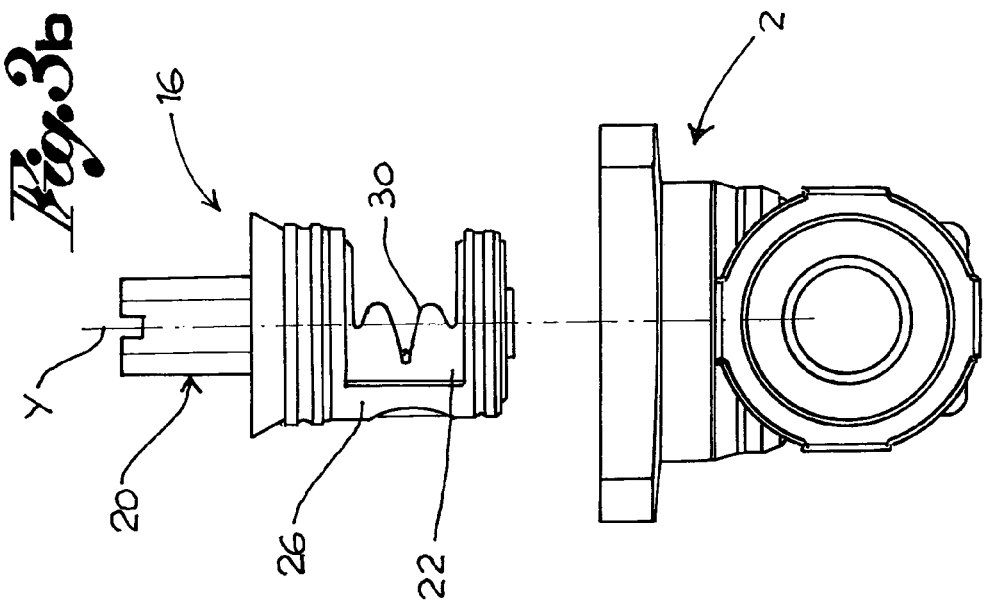
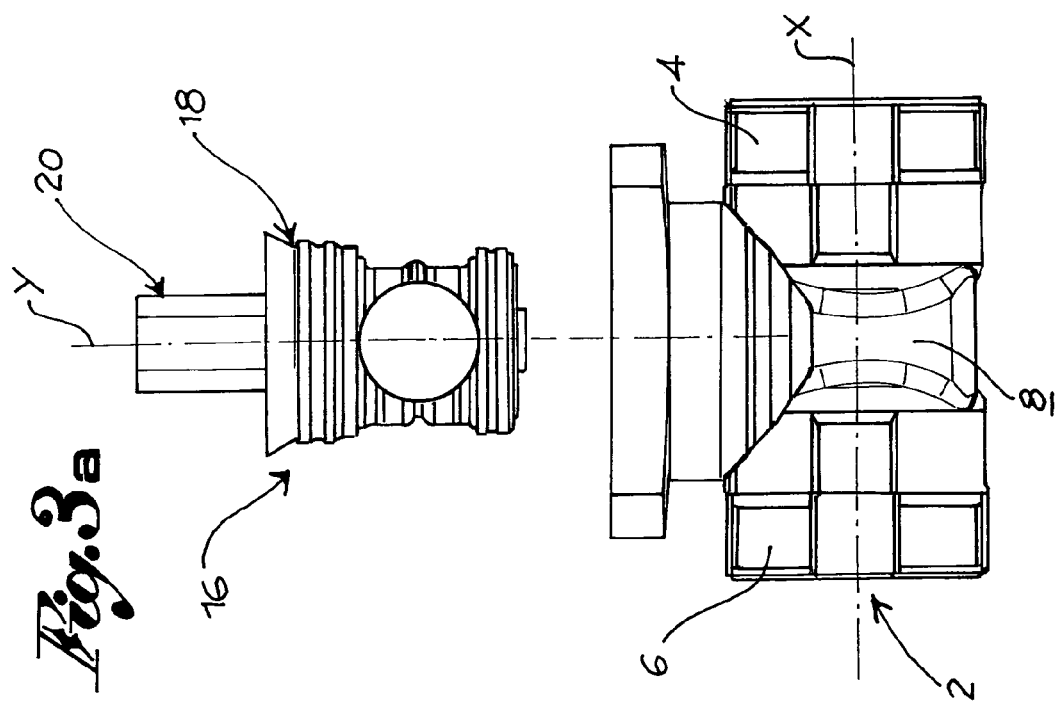

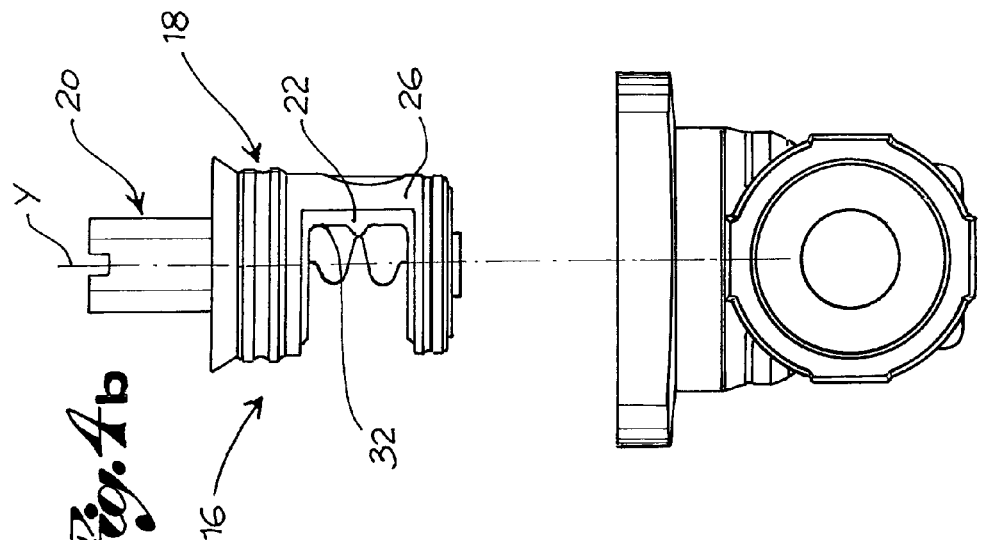
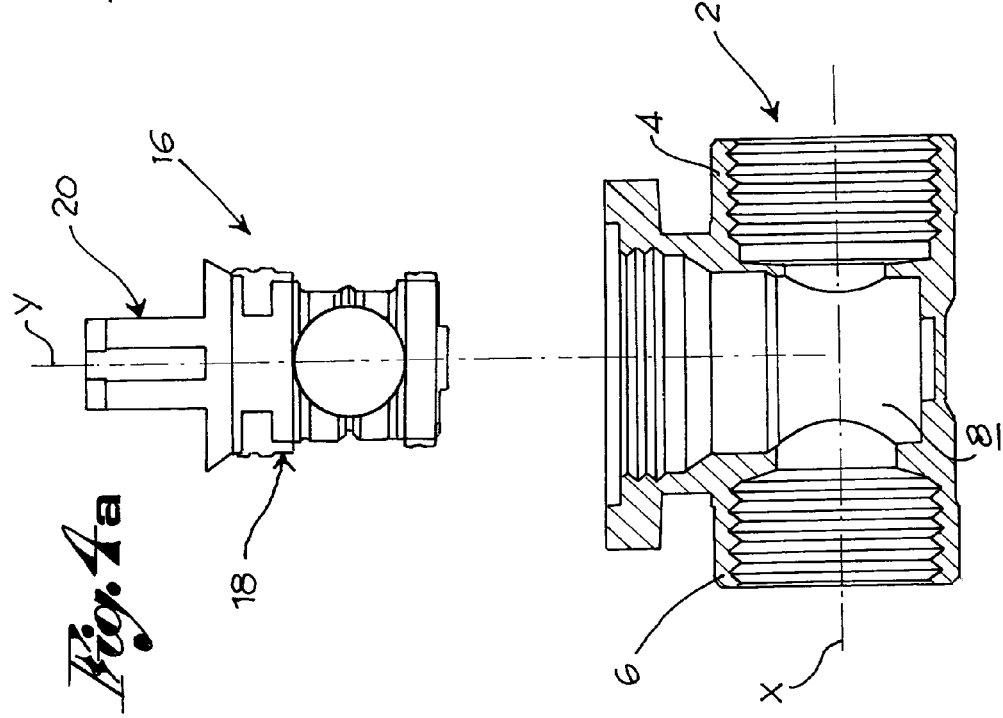

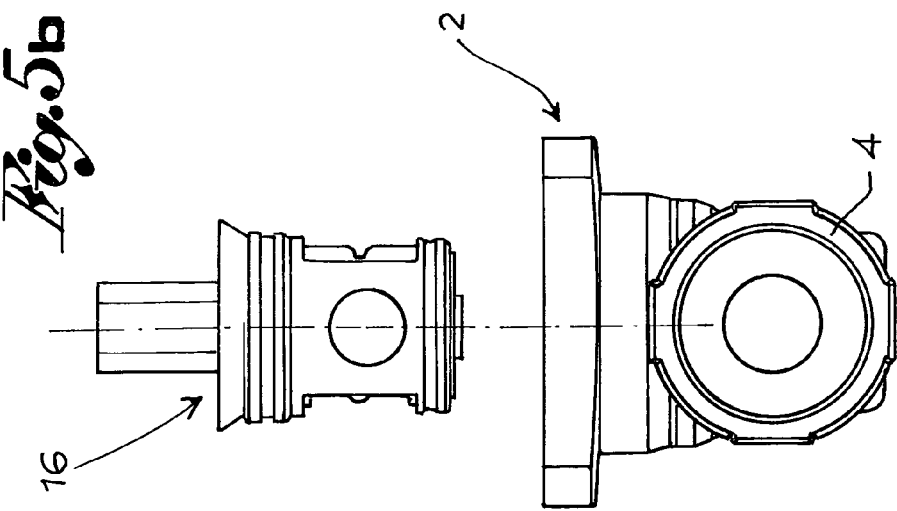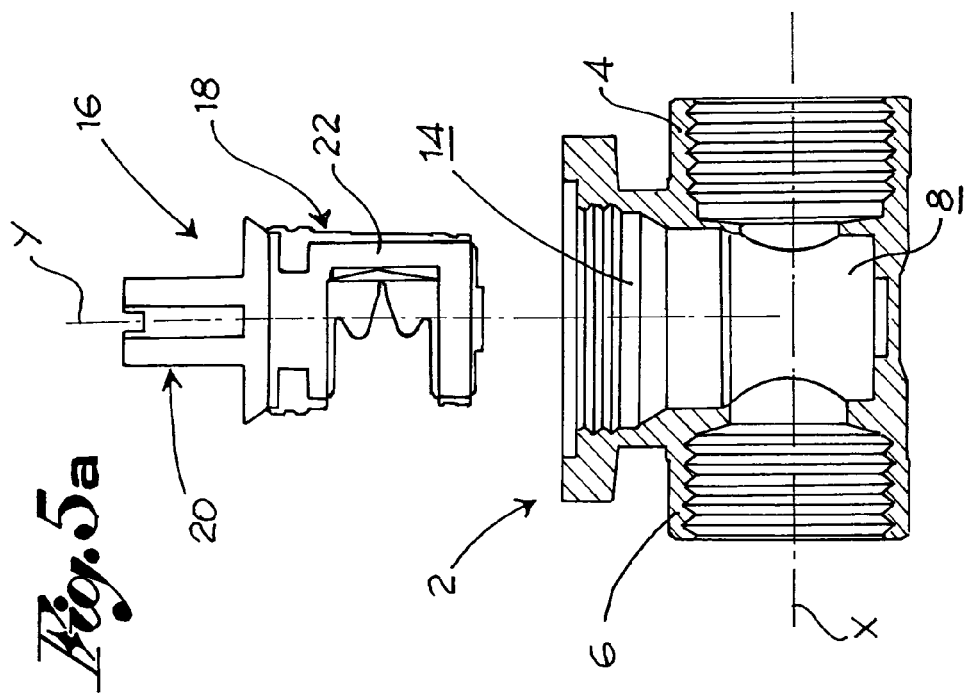

INTERCEPTING VALVE

FIELD OF THE INVENTION

The present invention relates to an intercepting valve of a fluid.

BACKGROUND OF THE INVENTION

As is known, an intercepting valve comprises a valve body and a obturator situated inside it which, when the valve is in the closed position, shuts off transit through the valve body to prevent the transit of fluid through the valve, and, in the open position, allows the transit of fluid.

In various rotated positions of the obturator, between the closed position and the open position, the valve body presents an opening for transit, the shape and extension of which influence the flow and/or pressure characteristics of the fluid coming out downstream of the valve body.

Many embodiments of valves have a shaped obturator so that the opening produced in the various rotated positions of the obturator is such that the fluid has the desired flow and/or pressure characteristics downstream of the valve body.

In the specialist language used in this sector it is said that the fluid has the desired characterisation depending on the rotation of the obturator.

For example, an embodiment and a method of fabrication of a shaped obturator are shown in the Italian patent application for invention BS2006A000061, in the Applicant's name.

The valves produced in such manner however have the negative feature of being designed to give the fluid certain characteristics and cannot satisfy the requirements of users requiring a different characterisation.

Sometimes, in order to resolve this shortcoming, the obturator is fabricated in the traditional manner, that is without any shaped opening to produce a certain characterisation and, downstream of the obturator, an obstructive element is mounted in the valve body which influences the fluid so as to give it certain characteristics.

An example in such sense is shown in the Italian patent application for invention BS2005A000076, in the Applicant's name.

The valves produced as described above however have the disadvantage of having higher manufacturing costs due to the production of the components and their assembly.

SUMMARY OF THE INVENTION

The aim of the present invention is to produce an intercepting valve with a shaped obturator giving the fluid a multiplicity of characteristics thus satisfying varying requirements.

Such aim is achieved by an intercepting valve comprising:
a valve body having a fluid input duct and fluid output duct, suitable for joining to a distribution network of the fluid;
an obturator lodged at least partially in the valve body between the input duct and output duct, it being possible to rotate the obturator from a closed position, in which it prevents the transit of the fluid from the input duct to the output duct, to a first open limit position, in which it defines a first opening for the transit of the fluid, the first opening having a first contour for a first characterisation of the fluid wherein in a further open limit position, the obturator defines a further opening, the opening having a further contour, different from the first, for a further characterisation of the fluid.

The valve according to the present invention may be fabricated according to a method of fabrication of an intercepting valve comprising the phases of:
having a semi-finished obturator comprising a semi-finished main body;
making a first shaped notch on a portion of the semi-finished main body so as to define at least partially an opening of the valve having a first contour, the notch having an end wall;
making on a further portion of the semi-finished main body a further notch shaped so as to define at least partially an opening of the valve having a further contour, different from the first, the further notch having the end wall as the separating wall with the first notch;
eliminating the end wall so as to allow communication between the first notch and the further notch.

BRIEF DESCRIPTION OF THE DRAWINGS

FIG. 3a shows a frontal view of the separate parts of the valve according to the invention, wherein the obturator is positioned in a first open configuration.

FIG. 3b shows a side view of the separate parts of the valve according to the invention, wherein the obturator is positioned in a first open configuration.

FIG. 4a shows a frontal view of the separate parts of the valve according to the invention, wherein the obturator is positioned in a second open configuration.

FIG. 4b shows a side view of the separate parts of the valve according to the invention, wherein the obturator is positioned in a second open configuration.

FIG. 5a shows a frontal view of the separate parts of the valve according to the invention, wherein the obturator is positioned in a closed configuration.

FIG. 5b shows a side view of the separate parts of the valve according to the invention, wherein the obturator is positioned in a closed configuration.

DETAILED DESCRIPTION OF THE INVENTION

Figure 1:
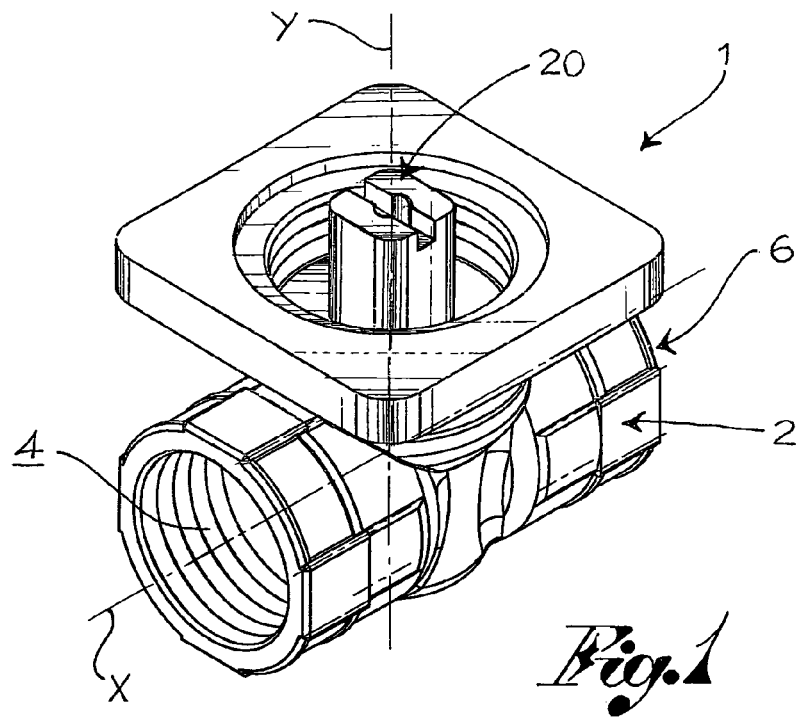
FIG. 1 shows a perspective view of a valve according to the present invention.
Figure 2:
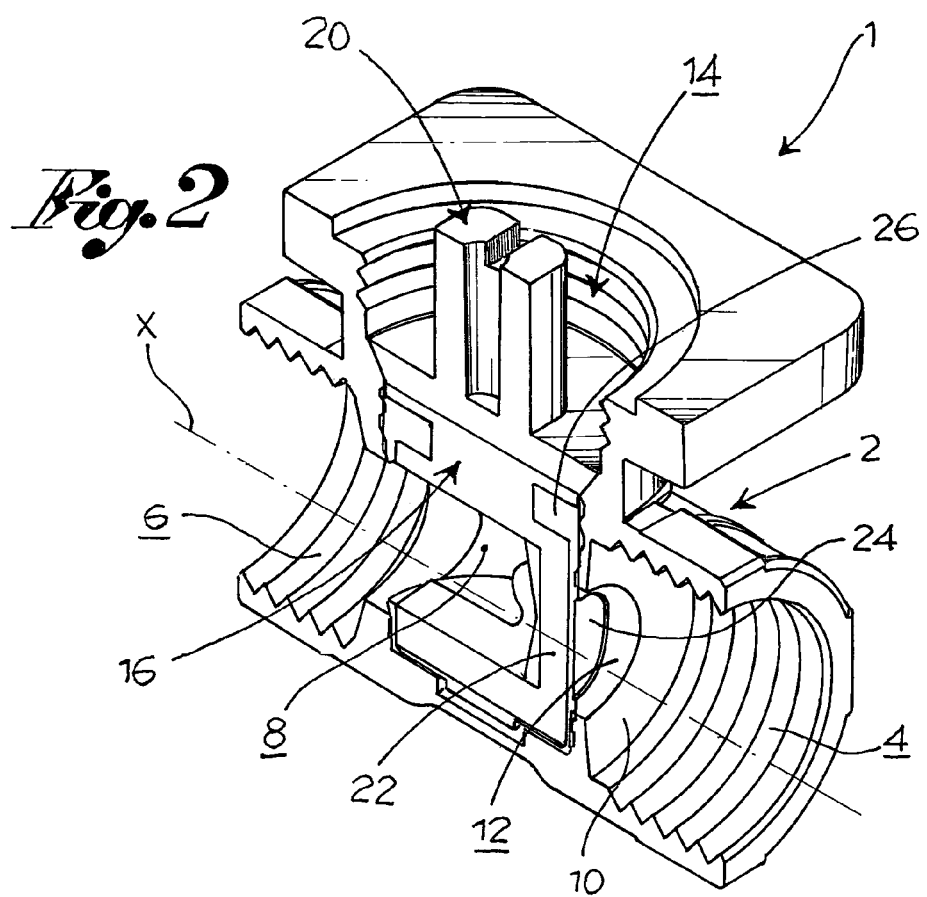
FIG. 2 shows a partial cross-section view of the valve in FIG. 1.

With reference to the attached figures, reference numeral 1 globally denotes an intercepting valve of a fluid.

The valve 1 comprises a valve body 2, with an incoming fluid duct 4 and an outgoing fluid duct 6, suitable for joining to a distribution network of a fluid.

For example the two ducts 4, 6 lie along the same rectilinear delivery axis X.

Preferably, the two ducts 4, 6 are cylindrical with a circular cross-section, considering a cross-section perpendicular to the delivery axis X.

Furthermore the valve body 2 has an obturator bay 8 inside it, situated between the input duct 4 and the output duct 6.

The valve body 2 also has a through wall 10, perforated by the opening 12, situated between the input duct 4 and the obturator bay 8.

According to a preferred embodiment, the valve body 2 comprises an access bay 14, which surmounts the input duct 4 and the output duct 6, and communicates with the obturator bay 8.

Furthermore, the valve 1 comprises an obturator 16, at least partially lodged in the valve body 2, between the input duct 4 and the output duct 6.

The obturator 16 extends along a rotating axis Y, which it can be rotated around.

The obturator 16 comprises a main body 18, suitable for being lodged in the obturator bay 8 of the valve body 2, and a command stem 20, protruding from the main body 18.

When the obturator 16 is lodged in the valve body 2, the stem 20 protrudes from the obturator bay 8, through the access bay 14 and juts out from the outside of the valve body 2, to enable manoeuvring of the obturator.

The main body 18 comprises a sealing wall 22 having a facing surface 24, preferably coinciding with a portion of a cylindrical surface of circular cross-section.

Preferably, the valve 1 comprises a sealing strip 26, which covers, at least partially the facing surface 24 of the main body 18 of the obturator.

The sealing wall 22 extends circumferentially in relation to the rotation axis Y.

At a first circumferential extremity, the sealing wall 22 has a first contour 30 having a predetermined shape (FIG. 3b).

At the other circumferential extremity the sealing wall 22 has a further contour 32 having a predetermined shape different from the shape of the first contour 30 (FIG. 4b).

The main body 18 of the obturator 16 being lodged in the obturator bay 8, the obturator can be rotated from a closed position in which it prevents the transit of fluid from the input duct 4 to the output duct 6, to a first open limit position in which it defines a first opening for the transit of fluid.

The first opening presents the first contour 30 for a first characterisation of the fluid.

In other words, in the closed position, the sealing wall 22 obstructs the hole 12 of the valve body 2, preventing the transit of fluid from the input duct 4 towards the output duct 6. The facing surface 24 of the sealing wall 22 faces towards the input duct 4.

The sealing strip 26 attached to the facing surface 24 forms, in the closed position, a seal between the input duct 4 and the obturator bay 8.

In the first open limit position, rather, the first contour 30 of the sealing wall 22 of the main body 16 defines, with the walls of the valve body, the first opening. This opening has a cross-section for transit with a predetermined shape, from which a first characterisation of the fluid derives.

Furthermore, in a further open limit position, the obturator defines a further opening, the opening having a further contour 32, different from the first, for a further characterisation of the fluid.

In other words, in the further open limit position the further contour 32 of the sealing wall 22 of the main body 16 defines, together with the walls of the valve body, the further opening. The opening has a cross-section of transit of a further predetermined shape, from which a further characterisation of the fluid derives.

The obturator passes from the closed position to the first open limit position by turning clockwise and from the closed position to the further open limit position by turning anti-clockwise.

In the first open limit position the obturator strikes against the wall to prevent further rotation clockwise and, in the further open limit position strikes against the wall to prevent further rotation anti-clockwise.

During normal use of the valve described above, by turning the obturator, from the closed position in a clockwise direction, the fluid is delivered in accordance with a first characterisation, while by turning the obturator from the closed position anti-clockwise, the fluid is delivered in accordance with a second, different characterisation.

Figure 6B:
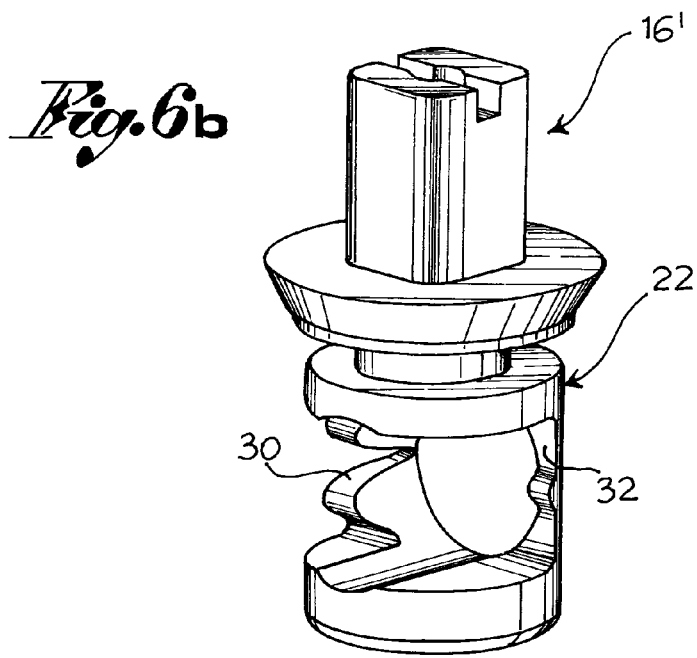
FIGS. 6a, 6b and 6c show the obturator of the valve according to the present invention in three stages of fabrication.
Figure 6A:
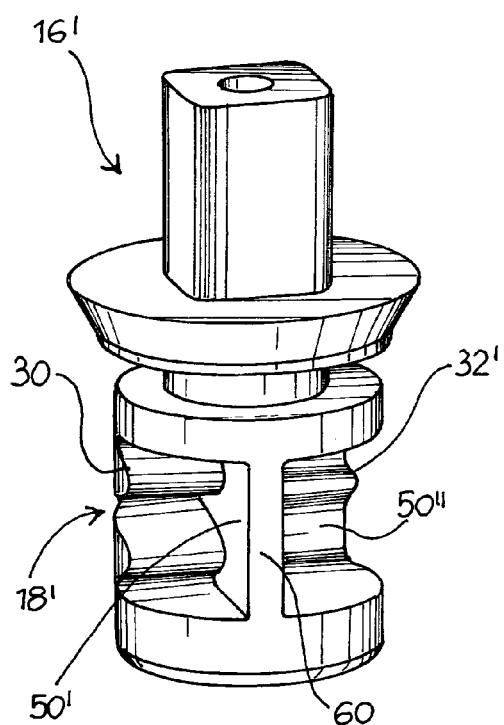

The valve in accordance with the present invention can be fabricated in accordance with a method of production comprising the phases of:
- having available a semi-finished obturator 16' comprising a semi-finished main body 18';
- making a first shaped notch 50' on a portion of the semi-finished main body 18' so as to define at least partially an opening of the valve having a first contour 30, the notch having an end wall 60;
- making on a further portion of the semi-finished main body 18' a further notch 50" shaped so as to define at least partially an opening of the valve having a further contour 32", different from the first, the further notch having the end wall 60 as the separating wall with the first notch (FIG. 6a);
- eliminating the end wall 60 so as to have the first notch 50' communicate with the further notch 50", thus obtaining the obturator 16 (FIG. 6b).

According to a preferred form of execution of the method, the phase of fabrication of the first notch 50' is simultaneous with the phase of fabrication of the further notch 50".

For example, the phases of fabrication of the notches 50', 50" consist in a process of removal of material or else of deformation.

Figure 6C:
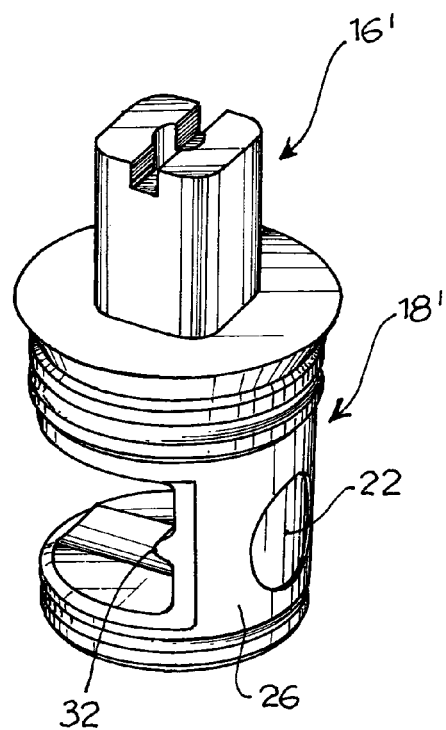

According to a further form of execution, the method comprises the further phase of coating at least partially the facing surface 22 of the main body 18 of the obturator 16 with the sealing strip 26 (FIG. 6c).

According to yet a further form of execution, the method comprises the further phase of predisposing the valve body 2 comprising the input duct 4, the output duct 6, the obturator bay 8 situated between the ducts 4, 6 and the access bay 14 which surmounts the ducts 4, 6 and communicating with the obturator bay 8, as well as inserting the obturator 16 in the valve body 2 through the access bay 14, positioning the main body 18 in the obturator bay 8.

Innovatively, the valve according to the present invention permits a multiple characterisation of the fluid, depending on the direction of rotation of the obturator.

According to a further advantageous form, the obturator can be easily replaced even when the valve is installed in the distribution network of the fluid, given that it is accessible from the access bay which surmounts the input and output ducts.

According to a further advantageous aspect, the sealing material, distributed in such a way as to cover the facing surface of the main body of the obturator, suffers from less wear due to the transit of fluid and phenomena such as that of cavitation.

The invention claimed is:

1. An intercepting valve for a fluid, comprising:
   a valve body having a fluid input duct and fluid output duct, suitable for joining to a distribution network of the fluid;
   an obturator lodged at least partially in the valve body between the input duct and output duct, the obturator being rotatable from a closed position, in which it prevents the transit of the fluid from the input duct to the output duct, to a first open limit position, in which it defines a first opening for the transit of the fluid, the first opening having a first contour for a first characterisation of the fluid;
   wherein in a further open limit position, the obturator defines a further opening, the opening having a further contour, different from the first, for a further characterisation of the fluid;
   wherein the obturator passes from the closed position to the first open limit position by turning clockwise and passes from the closed position to the further open limit position by turning anti-clockwise; and wherein the obturator, in the first open limit position strikes against the wall, to prevent further rotation clockwise and, in the further open limit position strikes against the wall to prevent any further rotation anti-clockwise.

2. Valve according to claim 1, wherein the obturator defines the openings jointly with the walls of the valve body.

3. Valve according to claim 1, comprising an obturator bay between the input duct and the output duct, and wherein the obturator comprises a main body, lodged in the obturator bay, comprising a sealing wall which, in the closed position, interrupts the fluidic connection between the input duct and the output duct, the sealing wall having a facing surface, facing the input duct in the closed position.

4. Valve according to claim 3, comprising at least one sealing strip positioned on the facing surface so as to form a seal with the entrance of the input duct.

5. Valve according to claim 4, wherein the strip extends along the facing surface, covering it beyond the cross-section of the entrance of the input duct.

6. Valve according to claim 3, wherein the facing surface is a portion of a cylindrical surface with circular cross-section.

7. Valve according to claim 3, wherein the valve body has an access bay, communicating with the obturator bay, which surmounts the input and output ducts, the obturator being inserted inside the valve body through the access bay.

8. Valve according to claim 1, wherein the input duct and the output duct have a rectilinear delivery axis wherein the obturator can be rotated around a rotation axis, the rotation axis being perpendicular to the delivery axis.

* * * * *